(12) United States Patent
Croxford (10) Patent No.: US 10,545,559 B2
(45) Date of Patent: Jan. 28, 2020

(54) DATA PROCESSING SYSTEM AND METHOD

(71) Applicant: Apical Ltd, Cambridge, Cambridgeshire (GB)

(72) Inventor: Daren Croxford, Swaffham Prior (GB)

(73) Assignee: Apical Limited, Cambridge (GB)

( * ) Notice: Subject to any disclaimer, the term of this patent is extended or adjusted under 35 U.S.C. 154(b) by 131 days.

(21) Appl. No.: 15/899,617

(22) Filed: Feb. 20, 2018

(65) Prior Publication Data

US 2019/0258306 A1 Aug. 22, 2019

(51) Int. Cl.
| | |
|---|---|
| *G06F 1/00* | (2006.01) |
| *G06F 1/26* | (2006.01) |
| *G06F 1/3215* | (2019.01) |
| *G06F 7/57* | (2006.01) |
| *G06N 3/04* | (2006.01) |
| *G06F 1/04* | (2006.01) |
| *G06N 5/04* | (2006.01) |
| *G06N 20/00* | (2019.01) |

(52) U.S. Cl.
CPC .............. *G06F 1/3215* (2013.01); *G06F 1/04* (2013.01); *G06F 7/57* (2013.01); *G06N 3/04* (2013.01); *G06N 5/046* (2013.01); *G06N 20/00* (2019.01)

(58) Field of Classification Search
None
See application file for complete search history.

(56) References Cited

U.S. PATENT DOCUMENTS

2015/0301584 A1 10/2015 Sideris et al.

*Primary Examiner* — Nitin C Patel
(74) *Attorney, Agent, or Firm* — EIP US LLP (57) ABSTRACT

A data processing system comprising an arithmetic logic unit (ALU) configured to perform a data processing operation. The data processing system also includes a register arranged to receive an output of the data processing operation, the register comprising a plurality of single-bit storage devices arranged to store binary data of a predetermined data size. A control system is arranged to place a subset of the plurality of single-bit storage devices into a power saving state based on at least one parameter relating to the data processing operation, to limit an output data size of the output of the data processing operation to less than the predetermined data size.

20 Claims, 4 Drawing Sheets

DATA PROCESSING SYSTEM AND METHOD

BACKGROUND OF THE INVENTION

Field of the Invention

The present invention relates to a data processing system and a data processing method.

Description of the Related Technology

The present invention relates to a data processing system and a data processing method.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
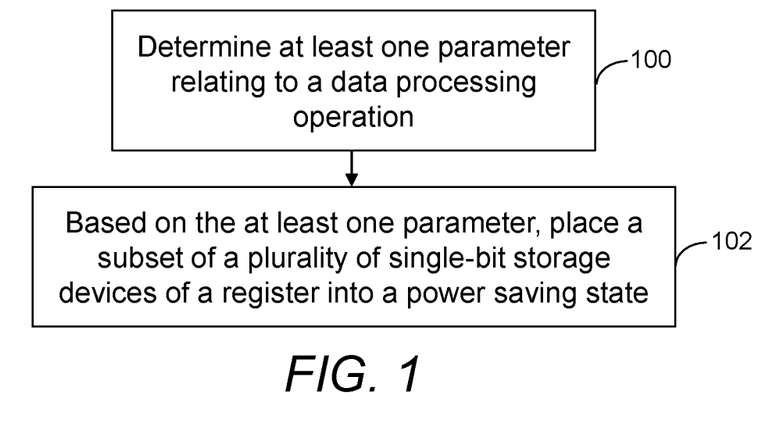
FIG. 1 is a flow diagram showing a data processing method according to examples.

FIG. 1 is a flow diagram showing a data processing method according to examples. The data processing method of FIG. 1 may be implemented by a data processing system, such as the data processing system illustrated schematically in FIG. 5 (described below).

At item 100 of FIG. 1, at least one parameter relating to a data processing operation arranged to be implemented by an arithmetic logic unit (ALU) is determined.

Item 102 of the method of FIG. 1 involves, based on the at least one parameter, placing a subset of single-bit storage devices of a register into a power saving state, to limit an output data size of an output of the data processing operation to less than a predetermined data size. The register is for example arranged to receive the output of the data processing operation and the plurality of single-bit storage devices are arranged to storage binary data of the predetermined data size. By placing the subset of single-bit storage devices of the register into the power saving state, the method of FIG. 1 may therefore reduce power consumption during implementation of the data processing operation.

A data size of data may for example correspond with a bit length of binary data, which is for example the minimum number of bits to adequately represent an integer. Binary data is typically represented in the base-2 numeral system (sometimes referred to as the binary numeral system) in which each digit may take a value of either zero or one. A binary number in the base-2 numeral system is typically ordered in sequence from a lowest bit position to a highest bit position. In general, a bit length of such a binary number may be taken as the highest bit position which takes a value of 1. Typically, bit positions are taken to increase from right to left, from zero upwards. For example, for the binary number 1101, the zeroth bit position has a value of 1, the first bit position has a value of 0, the second bit position has a value of 1 and the third bit position has a value of 1. In this case, both the binary numbers 1101 and 01101 may be considered to have a bit length of four, as the highest bit position which takes a value of 1 is four for each of these numbers.

A single-bit storage device may be any component which may be used to store no more than one bit of data. Typically, a single-bit storage device is an electronic component with two stable states, one of which represents a value of zero and the other of which represents a value of one, for example. A flip-flop and a latch are each examples of single-bit storage devices, as discussed further below.

The predetermined data size for example corresponds with the number of single-bit storage devices of the register. For example, a register including eight single-bit storage devices may be considered to have a predetermined data size of eight. However, while a register may be able to store data with a data size up to and equal to the predetermined data size, in some cases the data to be stored in the register may have a data size of less than the predetermined data size. For example, if the data to be stored has a bit length of four, only four single-bit storage devices of an eight-bit register may be used to store the data. The remaining single-bit storage devices may store a value of zero.

Typically, each single-bit storage device is updated upon receipt of an input to the register (which is also for example input to each of the single-bit storage devices). For example, the register may be arranged to receive a clock signal from a clock. In cases such as this, for example where the single-bit storage devices are synchronous, such as flip-flops, the single-bit storage devices ignore their inputs until a transition of the clock signal. At this point, the single-bit storage devices either change or retain their outputs based on the values of the inputs. In examples in which the single-bit storage devices are asynchronous, such as latches, the single-bit storage devices change their outputs in response to a change in value of at least one input.

In general, each single-bit storage device of a register is updated upon receipt of an input (such as a clock transition), regardless of whether the single-bit storage device is storing useful data or not. For example, in a synchronous system in which each single-bit storage device of a register is arranged to store a value of zero, and for which the inputs to the single-bit storage devices are unchanging, each single-bit storage device will nevertheless process the inputs each time a clock transition is received. Processing of inputs by a single-bit storage device consumes power, regardless of whether the processing leads to a change in the value stored by the single-bit storage device or not. Registers with a plurality of single-bit storage devices may therefore consume a relatively large amount of power.

In examples described herein, however, a subset of single-bit storage devices are placed into a power saving state. For example, the subset of single-bit storage devices may be single-bit storage devices which are not needed to store the output of the data processing operation. For example, determining the at least one parameter may include determining the output data size of the output of the data processing operation. In such cases, the number of single-bit storage devices that are placed into the power saving state may be less than or equal to the difference between the predetermined data size and the output data size. The number of single-bit storage devices that are not placed into the power saving state may therefore be greater than or equal to the output data size in order to store the entirety of the output, without discarding any of the output. For example, if it is determined that the output data size is four bits but the predetermined data size of the register is eight bits (for example, with the register including eight single-bit storage devices), four of the single-bit storage devices may be placed into the power saving state.

The subset of the single-bit storage devices may be placed into the power saving state for example by clock gating a clock signal of a clock coupled to the subset of the single-bit storage devices. Clock gating for example effectively switches off the single-bit storage devices, for example so that the single-bit storage devices not process their inputs. For example, clock gating may mean that the subset of single-bit storage devices do not receive a clock transition and therefore are not triggered to process their inputs. In other examples, though, other methods may be used to place the subset of the single-bit storage devices into the power saving state.

In examples, determining the at least one parameter may include determining which of a plurality of inputs for input to the data processing operation has a largest input data size. For example, the same data processing operation may be applied a number of times with various different inputs. However, the plurality of inputs to be input to the data processing operation may be known prior to performing the data processing operation. For example, the data processing operation may be performed as part of a machine learning system, during classification (as discussed further below, and which may sometimes be referred to as inference). In these cases, there may be a predetermined set of weights associated with the machine learning system, for example obtained during training of the machine learning system. The machine learning system may therefore be completely deterministic, in that the weights associated with respective nodes of the machine learning system may be determined before data to be classified is processed using the machine learning system and there may be no conditional computation. The deterministic nature of such a system may be exploited to reduce the power consumption during use of the machine learning system for classification. For example, if the largest input data size to be input to the data processing operation (for example as part of a machine learning system) is known, the output data size for an output obtained by inputting the input with the largest input data size to the data processing operation can be determined. Based on this, it may be determined how many or which of the single-bit storage devices to place into the power saving state, while still maintaining sufficient of the single-bit storage devices in an active state to be able to store this output (which is for example the largest output obtainable using the data processing operation).

In cases such as this, the at least one parameter may be determined before the plurality of inputs are input to the data processing operation. The subset of the single-bit storage devices may also be placed in the power saving state before the plurality of inputs are input to the data processing operation. This allows the method to be performed fewer times than the data processing operation, further reducing power consumption. For example, the method may be performed solely once for a given set of inputs, rather than recalculating which single-bit storage devices to place in the power saving state each time new data is input to the data processing operation.

The input data size of an input to the data processing operation may be performed by analyzing or processing the input itself. Alternatively, though, the input data size may be determined based on metadata associated with the input. For example, where the data processing operation is arranged to receive image data representative of at least a portion of an image as an input, the at least one parameter may be determined based on metadata associated with the image data. In such cases, the at least one parameter may include a parameter representative of an image data size of the image data.

In examples such as this, the metadata may be representative of a dynamic range of at least a portion of the image. For example, the metadata may represent a histogram of a pixel intensity of pixels of a portion of the image. If the pixel intensities of the pixels are concentrated within a relatively small range of intensity values, with a low dynamic range (which is for example a difference between a maximum and a minimum intensity value with a non-zero value in the histogram), the image data size of the portion of the image may be smaller than an image data size for a different image portion with a larger dynamic range.

Determining the at least one parameter may also or alternatively include determining an effect of the data processing operation on an input data size of an input to the data processing operation. This may be used to determine the largest output size of an output obtainable with the data processing operation for a given input. A similar approach may also be used in examples in which the data processing operation is arranged to receive multiple inputs. For example, where the input is a first input with a first predetermined input data size and the data processing operation is arranged to receive two inputs, the two inputs being the first input and a second input with a second predetermined input data size, determining the output data size may include determining the output data size of the output of the data processing operation with the first input and the second input as the two inputs.

Figure 2:
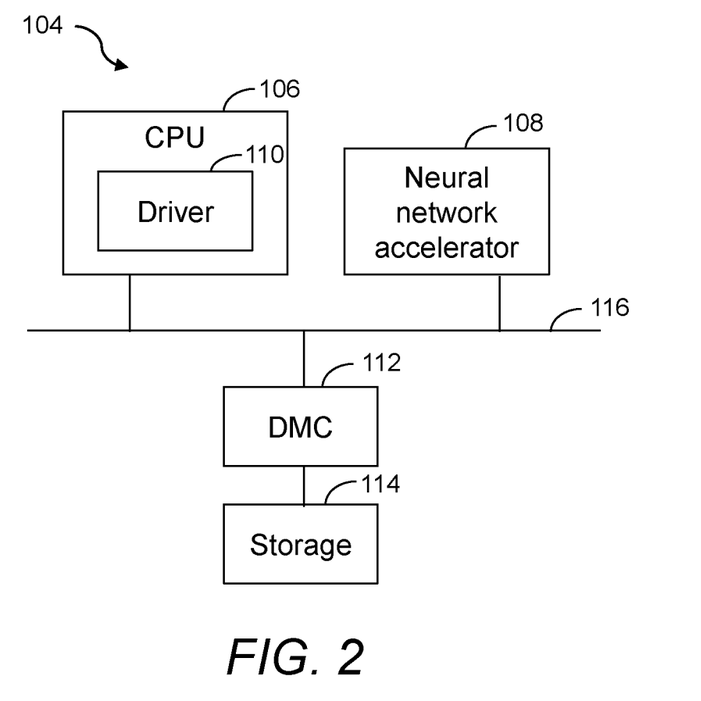
FIG. 2 shows schematically a computer device for use with a data processing method according to examples.

An example of a computer device 104 for use with the data processing method according to examples, such as the method of FIG. 1, is shown schematically in FIG. 2. The computer device 104 of FIG. 2 is a personal computer. However, in other examples, the methods described herein may be performed using other computer devices such as a smartphone, a laptop, a tablet or an on-board computer device which may be coupled to or mounted within a vehicle such as a car.

The computer device 104 includes at least one processor. In this example, the computer device 104 includes a central processor unit (CPU) 106. The computer device 104 also includes a neural network accelerator 108, which is a processor dedicated to implementing at least classification of data using a neural network. In other examples, though, the computer device may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computer device may also or alternatively include a processor implemented as a combination of computing devices, e.g., a combination of a DSP and a microprocessor, a plurality of microprocessors, one or more microprocessors in conjunction with a DSP core, or any other such configuration. The computer device may also or alternatively include at least one graphics processing unit (GPU).

The CPU 106 of FIG. 2 includes a driver 110 which for example provides an interface between software configured to control or configure the neural network and the neural network accelerator 108, which is configured to perform the processing to implement the neural network. In other examples, though, a neural network may be implemented using a more general processor, such as the CPU or a GPU.

The computer device 104 of FIG. 2 also includes a dynamic memory controller (DMC) 112 which may be used to control access to storage 114 of the computer device 104. The storage 114 is for example external to the neural network accelerator 108 and may be a random access memory (RAM) such as DDR-SDRAM (double data rate synchronous dynamic random access memory). In other examples, the storage 114 may be or include a non-volatile memory such as Read Only Memory (ROM) or a solid state drive (SSD) such as Flash memory. The storage 114 in examples may include further storage devices, for example magnetic, optical or tape media, compact disc (CD), digital versatile disc (DVD) or other data storage media. The storage 114 may be removable or non-removable from the computer device 104.

The components of the computer device 104 in the example of FIG. 2 are interconnected using a systems bus 116. This allows data to be transferred between the various components. The bus 116 may be or include any suitable interface or bus. For example, an ARM® Advanced Microcontroller Bus Architecture (AMBA®) interface, such as the Advanced eXtensible Interface (AXI), may be used.

As explained above, the computer device 104 in the example of FIG. 2 is arranged to implement the classification phase of a neural network. An example of a neural network 118 is shown schematically in FIG. 3.

Figure 3:
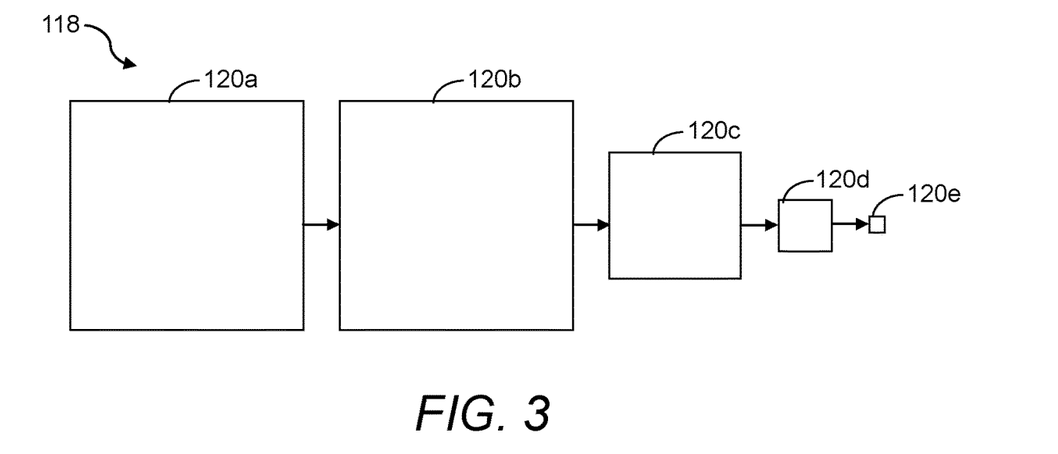
FIG. 3 shows schematically a neural network according to examples.

The neural network 118 includes a number of different layers 120*a*, 120*b*, 120*c*, 120*d*, 120*e*. In FIG. 3, the neural network 118 is a convolutional neural network. A typical convolutional neural network includes an input layer (120*a*), a plurality of convolutional layers (two of which, 120*b*, 120*c*, are shown in FIG. 3), a number of fully connected layers (one of which, 120*d*, is shown in FIG. 3) and an output layer 120*e*. The input layer for example corresponds with an input to the neural network 118, which in this example is image data. The image data is for example 224 pixels wide and 224 pixels high and includes 3 color channels (such as a red, green and blue color channel). The convolutional layers typically extract particular features from the input data, to create feature maps, and may operate on small portions of an image. The fully connected layers then use the feature maps for classification. In the example of FIG. 3, the output of the second layer 120*b* undergoes pooling before it is input to the third layer 120*c*. Pooling for example allows values for a region of an image or a feature map to be aggregated or combined, for example by taking the highest value within a region. For example, with 2×2 max pooling, the highest value of the output of the second layer 120*b* within a 2×2 patch of the feature map output from the second layer 120*b* is used as an input to the third layer 120*c*, rather than transferring the entire output of the second layer 120*b* to the third layer 120*c*. This reduces the amount of computation for subsequent layers of the neural network 118. This is shown schematically in FIG. 3 as a reduction in size of the third layer 120*c* compared to the second layer 120*d*. Further pooling is performed between the third and fourth layers 120*c*, 120*d* and between the fourth and fifth layers 120*d*, 120*e*. It is to be appreciated that the neural network 118 of FIG. 3 has been greatly simplified for ease of illustration and that typical neural networks may be significantly more complex.

In general, neural networks such as the neural network 118 of FIG. 3 may undergo what is referred to as a training phase, in which the neural network is trained for a particular purpose. A neural network typically includes a number of interconnected nodes, which may be referred to as neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights may be adjusted throughout training, altering the output of individual neurons and hence of the neural network as a whole.

In the example of FIG. 3, the neural network 118 has been trained to classify image data, for example to determine whether a particular object is present in the image represented by the image data. Training the neural network 118 in this way for example generates one or more kernels associated with at least some of the layers (such as layers of the neural network 118 other than the input layer 120*a* and the output layer 120*e*). The kernels for example allow features of an image to be identified. For example, some of the kernels may be used to identify edges in the image represented by the image data and others may be used to identify horizontal or vertical features in the image (although this is not limiting, and other kernels are possible). The precise features that the kernels identify will depend on the object that the neural network 118 is trained to identify. The kernels may be of any size. As an example, each kernel may be a 3 by 3 matrix, which may be convolved with the image data with a stride of 1. The kernels may be convolved with an image patch (or a feature map obtained by convolution of a kernel with an image patch) to identify the feature the kernel is designed to detect. Convolution generally involves adding each pixel of an image patch (in this example a 3 by 3 image patch) to its neighboring pixels, weighted by the kernel. A stride for example refers to the number of pixels a kernel is moved by between each operation. A stride of 1 therefore indicates that, after calculating the convolution for a given 3 by 3 image patch, the kernel is slid across the image by 1 pixel and the convolution is calculated for a subsequent image patch. This process may be repeated until the kernel has been convolved with the entirety of the image (or the entire portion of the image for which a convolution is to be calculated). A kernel may sometimes be referred to as a filter kernel or a filter. A convolution generally involves a multiplication operation and an addition operation (sometimes referred to as an accumulation operation). Thus, a neural network accelerator, such as that of FIG. 2, may include a multiplier-accumulator (MAC) unit configured to perform these operations, as described further below with reference to FIG. 5.

After the training phase, the neural network 118 (which may be referred to as a trained neural network 118) may be used to classify input images. For example, the neural network 118 may be used to identify whether the object the neural network 118 has been trained to identify is present in a given input image. This process may be referred to as classification. Classification typically involves convolution of the kernels obtained during the training phase with image patches of the input image.

In the example of FIG. 3, the second layer 120b involves the convolution of 64 different kernels with the image data of the first layer 120a. Each of the 64 kernels is for example arranged to identify a different respective feature of the image data. In the example of FIG. 3, in which the image data is 224 by 224 pixels, with 3 color channels, and is convolved with 64 kernels of a size of 3 by 3 pixels, the second layer 120b of the neural network 118 involves 224×224×3×(3×3)×64 multiply-accumulate operations, i.e. 86 million multiply-accumulate operations. There will also be a large number of further multiply-accumulate operations associated with each of the third and fourth layers 120c, 120d of the neural network 118, which involve convolving the output of the previous layer with 256 kernels and 512 kernels respectively in this example, in which the neural network 118 is the VGG-16 convolutional neural network. As will be appreciated, though, other neural networks may involve convolutions with a different number of kernels. Nevertheless, classification of an image using a neural network typically involves a larger number of data processing operations, each of which consumes power.

As explained above, due to the high power consumption of classification of an image, in examples classification of data, such as image data, may be performed using a neural network accelerator which is dedicated to this process. Internal components of the neural network accelerator 108 of FIG. 2 are shown schematically in FIG. 4.

Figure 4:
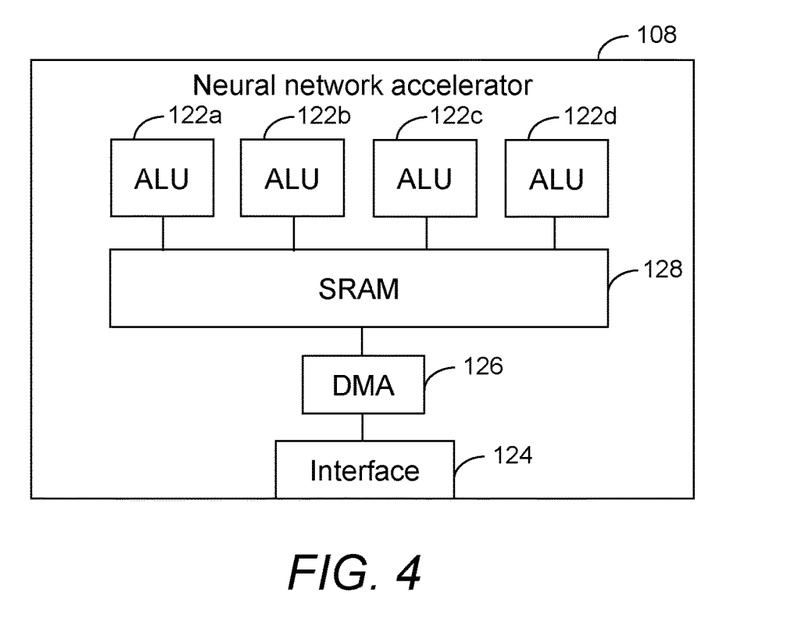
FIG. 4 shows schematically internal components of the neural network accelerator of FIG. 2.

The neural network accelerator 108 includes a plurality of ALUs 122a, 122b, 122c, 122d, collectively referred to with the reference numeral 122. Components of one of the ALUs 122a is shown in more detail in FIG. 5, described below. The ALUs 122 are each arranged to perform a multiply-accumulate operation, for example in order to perform the convolutions discussed above.

The neural network accelerator 108 includes an interface 124, via which inputs to the neural network 118 may be received, for example from other components of the computer device 104, such as the driver 110 of the CPU 106 of the storage 114. For example, the CPU 106 may include software configured to determine the at least one parameter relating to a data processing operation arranged to be implemented by an ALU, where the at least one parameter may be used to place the subset of a plurality of single-bit storage devices of a register into a power saving state as explained above. The ALU typically includes at least one MAC unit (generally an array of MAC units), although other ALUs are possible. In general, an ALU may be considered to be any electronic circuit that may perform arithmetic and bitwise operations on binary numbers. The at least one parameter may therefore be transferred to the neural network accelerator 108 via the interface 124. In other examples, the at least one parameter may be determined by the neural network accelerator 108 itself, for example using hardware.

Other inputs which may be received by the neural network accelerator 108 via the interface 124 include image data representative of an image to be classified using the neural network and kernel data representative of a kernel associated with the neural network after training. For example, the neural network may be trained either by the computer device 104 or by an external computer device or computer system, for example using a GPU. The output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, as part of the convolution of the kernel with the image patch.

The neural network accelerator 108 of FIG. 4 also includes a direct memory access (DMA) which allows the neural network accelerator 108 to access the storage 114 directly, independently of the CPU 106. This may improve the speed at which the neural network accelerator 108 is able to perform classification of input data. For example, the neural network accelerator 108 may access inputs, to be input to the classification process, directly from the storage 114 (which may be main memory or system memory), without having to wait for the CPU 106 to be available. For example, the at least one parameter, the image data and the kernel data may be stored in the storage 114 and retrieved from the storage 114 by the neural network accelerator 108.

The neural network accelerator 108 includes static random access memory (SRAM) 128, which may be used to store inputs to the classification process implemented by the ALUs 122. For example, the SRAM may be on-chip or local memory of the neural network accelerator 108, which is generally quicker to access than the storage 114. The SRAM may include a plurality of separate storage areas. For example, the image data may be stored in a different storage area from the kernel data (although, in some cases, they may be stored in the same storage area).

Figure 5:
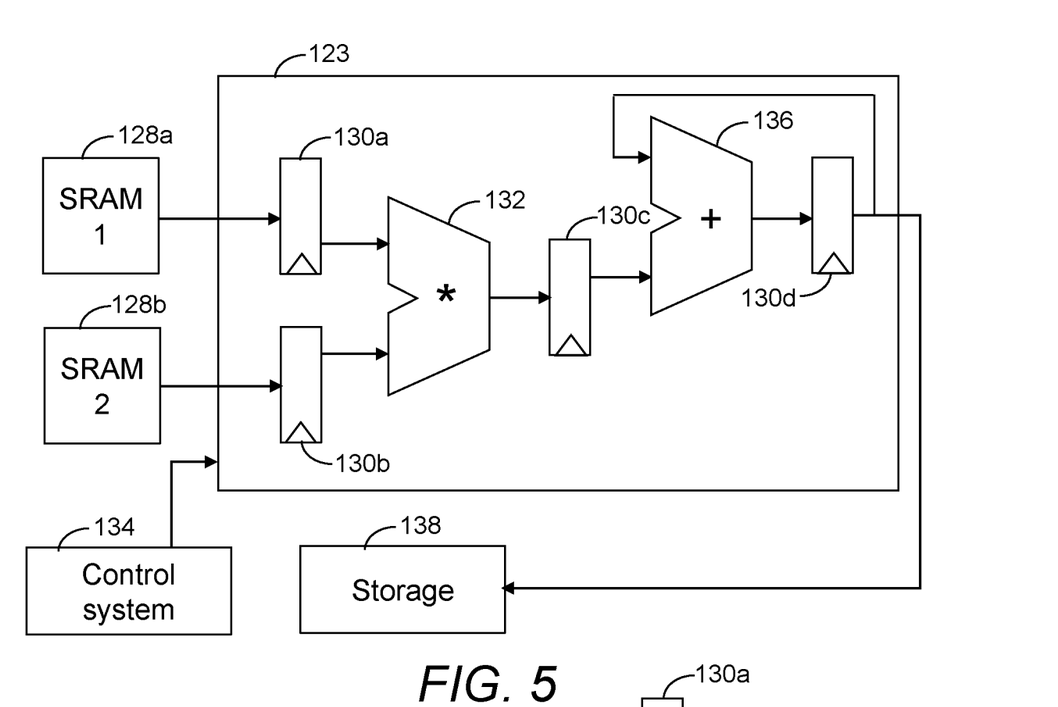
FIG. 5 shows schematically a data processing system according to examples.

Features of the neural network accelerator 108 are shown in more detail in FIG. 5. In the example of FIG. 5, the SRAM 128 shown schematically in FIG. 4 includes a first SRAM 128a and a second SRAM 128b. The first SRAM 128a is arranged to store weight data representative of weights associated with a machine learning system, in this example a neural network. In this example, the machine learning system is arranged to classify images. Hence, the weight data represents kernels to be convolved with image data, as described above. The weight data in this example may therefore be considered to be kernel data. The second SRAM 128b is arranged to store image data representative of at least a portion of an image to be classified by the machine learning system. The image data may be in any suitable format and may for example represent pixel intensity values for respective pixels of an image. The image data may include data for each of a plurality of color channels, such as the red, green and blue color channels.

FIG. 5 illustrates an example of a data processing system including an arithmetic logic unit (ALU) configured to perform a data processing operation. In FIG. 5, the ALU (which is for example the ALU 122a of FIG. 4) includes a first MAC unit 123, although in other examples an ALU for such a data processing system may include other components or may include a plurality of MAC units. The data processing operation the data processing system of FIG. 5 is configured to perform is a multiplication-addition operation, which may be used to implement the classification phase of a machine learning system, in this example a neural network, as described above.

In examples described herein, a data processing system such as that of FIG. 5 includes a register arranged to receive an output of the data processing operation, the register comprising a plurality of single-bit storage devices arranged to storage binary data of a predetermined data size. For example, where the ALU comprises a MAC unit, such as the first MAC unit 123 of FIG. 5, which is configured to perform a multiplication operation and an addition operation, the data processing operation may be considered to be either the multiplication operation or the addition operation. If the data processing operation is taken to be the multiplication operation, the register is arranged to receive an output of the multiplication operation. Conversely, if the data processing operation is taken to be the addition operation, the register is arranged to receive an output of the addition operation.

In the example of FIG. 5, the first MAC unit 123 includes a plurality of registers 130a, 130b, 130c, 130d, each of which is arranged to store data at various stages of the data processing system. In this case, the weight data is transferred from the first SRAM 128a to a first input register 130a and the image data is transferred from the second SRAM to a second input register 130b. The first and second input registers 130a, 130b provide inputs (sometimes referred to as operands) to a data processing operation, in this example a multiplication operation implemented by a multiplication unit 132. The multiplication operation may be considered to be a first data processing operation, as in this example the data processing system includes a plurality of data processing operations.

Data processing systems such as that of FIG. 5 may also include a control system arranged to place a subset of the plurality of single-bit storage devices into a power saving state based on at least one parameter relating to the data processing operation, to limit an output data size of the output of the data processing operation to less than the predetermined data size. Control systems such as this may therefore be used to reduce the power consumption of a data processing system. The control system 134 is shown schematically in FIG. 5, and is discussed further below with reference to FIG. 6.

In examples in which an ALU includes a plurality of registers, the control system may place a subset of a plurality of single-bit storage devices into a power saving state for more than one of the plurality of registers. For example, in FIG. 5, the control system 134 may be arranged to place a subset of the plurality of single-bit storage devices of one or both of the first and second input registers 130a, 130b into a power saving state. The control system may determine which of the plurality of single-bit storage devices of the first and/or second input registers 130a, 130b to place into the power saving state based on at least one parameter relating to the data processing operation (in this example, based on the multiplication operation). The at least one parameter may be representative of an input data size of an input to the first and/or second input registers 130a, 130b. For example, the at least one parameter may be representative of a largest input data size of a plurality of inputs.

In the example of FIG. 5, in which the first MAC unit 123 is used as part of a classification phase of a neural network, the input data size of a plurality of inputs may be known prior to receipt of the inputs by the first and/or second input registers 130a, 130b (or even prior to receipt of the inputs by the first and/or second SRAMS 128, 128b). For example, the weights associated with the neural network (which in this example represent kernels) may be predetermined as part of the training phase and therefore calculated prior to the classification phase. Typically, a large number of weights is determined during training of the neural network. Thus, the control system may determine which of the weights has the largest data size and then may limit the input data size of the first input register 130a (which is arranged to receive the weights) to the largest data size (which is for example less than the predetermined data size of the first input register 130a). The determination of the largest data size, and the placing of the subset of the plurality of single-bit storage devices into the power saving state may be performed infrequently (for example, once, in advance of classification of image data using the neural network). This may further reduce power consumption compared with recalculating the actual input data size as each input is received, for example by the neural network accelerator 108 or by the ALU.

While the weights associated with the neural network may be determined in advance of use of the neural network for classification, the image data to be classified may not be known up front. In cases such as this, a subset of single-bit storage devices of the first input register 130a for storing the weight data may be placed into a power saving state, but all of the single-bit storage devices of the second input register 130b may remain in an active state. An active state as used herein is for example a state of a single-bit storage device other than a power saving state. For example, where the single-bit storage device is a flip-flop, a default state of the flip-flop may be the active state, in which the flip-flop processes its inputs periodically, for example based on periodic receipt of a transition of a block. In this way, the second input register 130b may be able to store image data of any size up to the predetermined data size of the second input register 130b.

As will be appreciated, though, this may result in unnecessary processing by single-bit storage devices of the second input register 130b if the actual data size of image data input to the second input register 130b is less than the predetermined data size of the second input register 130b. Thus, to further reduce power consumption of the data processing system, at least one parameter used to determine which of the single-bit storage devices of the second input register 130b to place into the power saving state may be calculated based on the image data to be classified. For example, as explained above, metadata may be associated with the image data. The at least one parameter, which is for example representative of an image data size of the image data, may be determined based on the metadata. For example, the metadata may indicate that the image has been compressed to generate the image data, and may indicate a value of the image data size of the image data or a range of values associated with image data representative of a region of an image. In other examples, the metadata may include a histogram of an image intensity, for example where the image has been generated using an image signal processor (ISP), such as an ISP of a digital camera. This histogram may therefore may be used to determine a dynamic range of the image (or a portion of the image, where the image data represents a portion of an image rather than an entire image). For example, the dynamic range may be determined by calculating the difference between the maximum and minimum intensity, based on the histogram. In examples such as this, the image data size of the image may be determined by the control system 134 of the data processing system before the image data is transferred to the second input register 130b, so that an appropriate subset of single-bit storage registers of the second input register 130b can be placed into the power saving state before receipt of the image data by the second input register 130b. In examples such as this, a plurality of image portions may be processed (for example by convolving each image portion with a plurality of kernels). The single-bit storage registers of the second input register 130b to be placed into the power saving state may be recalculated for each image portion, for example based on a largest data size of the image data representative of the image portion to be processed. Typically, image data is 8-bit data for each of a plurality of color channels, such as red, green and blue color channels. In such cases, the image data may represent an intensity value of a color channel of a pixel of an image portion from a value of 00000000 in binary (e.g. representing a lightest shade of that color) to a value of 11111111 in binary (e.g. representing a darkest shade of that color). If, however, the maximum intensity value for a color channel of an image portion represented by image data to be processed by the first MAC unit 123 is 00001111 (for example if the image portion is relatively light in that color and does not include dark shades of that color), four of the single-bit storage registers of the second input register 130b may be placed into the power saving state.

As a further example, further power saving may be introduced if the largest weight size and the largest image data size can be determined. For example, if the largest weight in a kernel is 20 (in decimal) and the maximum value of the image data to be classified is 150 (in decimal), single-bit storage devices of a register of the SRAM may also be placed into a power saving state. For example, the maximum value that may be obtained in this example is 20*150=3000 (in decimal), which corresponds to 12 bits. Thus, if a register of the SRAM is arranged to store both the weight data and the image data and has a predetermined data size of larger than 12 bits, a subset of the plurality of single-bit storage devices of the register may be placed into the power saving state, provided that at least 12 single-bit storage devices remain active to receive the weight data and the image data, up to the maximum of 12 bits. This determination may be performed by the control system 134 of the neural network accelerator 108 for example, which may additionally be coupled to the SRAM 128.

Referring to FIG. 5, the weight data of the first input register 130a and the image data of the second input register 130b are processed by the multiplication unit 132 to multiply the weight represented by the weight data with the pixel value represented by the image data. The output of the multiplication unit 132 is transferred to a first output register 130c, which includes a first plurality of single-bit storage devices arranged to store binary data of a first predetermined data size.

In examples, the control system 134 is arranged to place a subset of the first plurality of single-bit storage devices of the first output register 130c into the power saving state based on at least one parameter related to the data processing operation (in this case, the multiplication operation), which may be referred to as a first at least one parameter for ease of reference. As explained above, the at least one parameter may include a first parameter representative of an input data size of an input to the data processing operation, such as a weight data size of a weight associated with a machine learning system, such as a neural network. The at least one parameter may further include a second parameter representative of an effect of the data processing operation on the input data size of the input. In this example, the data processing operation is multiplication so the second parameter may indicate that the effect of the data processing operation is to multiply the input, for example with another input. From this, the control system 134 may for example determine an output data size of an output of the data processing operation with the input, and may therefore place a subset of the plurality of single-bit storage registers of the first output register 130c into the power saving state where it is determined that the output data size is less than the predetermined data size of the first output register 130c. For example, the output data size determined by the control system 134 may be the largest data size obtainable by application of the data processing operation to an input with a predetermined input size. This allows the maximum number of single-bit storage devices to store data of the largest data size to be determined, so that the remaining single-bit storage devices may be placed into the power saving state.

As an illustrative example, if the largest weight in a kernel is 20 (in decimal) and the image data is 8-bit data (with a maximum value of 255 in decimal), the maximum output of a multiplication of the kernel with the image data is 255*20=5100 (in decimal), which corresponds to 13 bits in binary. A typical first output register 130c to receive an output from a multiplication unit 132 has a predetermined data size of 16 bits. Hence, the control system 134 may determine that the upper 3 single-bit storage registers of the first output register 130c (representing the 3 most significant bits of data with the predetermined data size) may be placed into the power saving state.

A similar procedure may be performed for the addition unit 136, which is for example arranged to receive the first output, which is output from the multiplication unit 132, as an input. In other examples, though, there may be other components between the multiplication unit 132 or the addition unit 136 or the multiplication unit 132 may be omitted (for example where the data processing system is configured to perform a different operation than classification, such as a process which does not involve multiplication). The addition unit 136 also receives a previous output of the addition unit 136 as an input. In this way, the addition unit 136 may be used to add an input value to a previous value, and may therefore act as an accumulator. The output of the addition unit 136 in FIG. 5 (which may be referred to as a second output) is stored in a second output register 130d, which includes a second plurality of single-bit storage devices arranged to store binary data of a second predetermined data size. The second predetermined data size may be the same as or different from the first predetermined data size. In the example of FIG. 5, the first predetermined data size is 16 bits and the second predetermined data size is 32 bits.

In FIG. 5, the control system 134 is arranged to place a subset of the second plurality of single-bit storage devices of the second output register 130d into the power saving state based on at least one parameter relating to the addition operation, to limit a second output data size of the second output (output from the addition operation) to less than the second predetermined data size. The at least one parameter relating to the addition operation may be referred to herein as a second at least one parameter.

As for the first at least one parameter, the second at least one parameter may be or include a first parameter representative of an input data size of an input to the addition operation, a second parameter representative of an effect of the addition operation on the input data size of the input and/or a parameter representative of an output data size obtainable by application of the addition operation to the input, such as a largest data size obtainable. As the addition unit 136 of FIG. 5 is arranged to receive the first output of the multiplication unit 132 as an input, the second at least one parameter may therefore include a parameter representative of the first output data size of the first output.

As an illustrative example, for a particular convolutional neural network, the VGG-16 convolutional neural network, the second layer (layer 120*b* of FIG. 3) involves a convolution of 64 different three by three kernels. This involves 3*3*64=576 multiplication-addition operations per result. For 8-bit image data, the maximum value will be 255*255*576=37454400 (in decimal), which can be represented by a 26-bit binary number. In this example, the maximum value the 8-bit image data may take is 255. Similarly, the weight data (which for example represents an element of a kernel) is also 8-bit in this case. The maximum value the weight data may take is therefore also 255. Hence, as there are 64 three by three kernels in this example, the maximum value that may be obtained by multiplication of these values is 255*255*576=37454400, as explained above. As the second predetermined data size is 32 bits, this means that the upper 6 single-bit storage devices of the second output register 130*d* may be placed into a power saving state.

Where each single-bit data storage device is a flip-flop, which is gated to place the single-bit storage device into the power saving state, the number of flip-flops which may be gated in this example (for the second layer of the VGG-16 neural network) may be summarized, for an image patch with a width of 224 pixels and a height of 224 pixels to be convolved with 64 kernels, each of a size of 3 pixels by 3 pixels, as follows:

|  | Predetermined data size of register (bits) | Largest data size (bits) | % gated |
|---|---|---|---|
| First input register 130a (for storing weight data) | 8 | 5 | 38 |
| Second input register 130b (for storing image data) | 8 | 8 | 0 |
| First output register 130c (for storing output of multiplication unit 132) | 16 | 12 | 25 |
| Second output register 130d (for storing output of addition unit 136) | 32 | 26 | 19 |

In examples such as this, the subset of the plurality of single-bit storage devices of one or more of the registers to be placed into the power saving state may be determined based on input data to be processed. For example, the single-bit storage devices to be placed into the power saving state may be calculated (or recalculated) on the fly, as new input data is received by the data processing system, for example by the neural network accelerator 108. In other examples, the subset of the plurality of single-bit storage devices to be placed into the power saving state may be precalculated but may vary over time, for example as new input data is processed by the data processing system (as the output of the addition unit 136 will generally increase as increasing data is summed).

In this example, the maximum value obtainable by processing the first three by three kernel with the image data may be calculated. For example, where the processing includes a multiplication of a kernel element (with a maximum value of 255) with a pixel value (with a maximum value of 255) for each of the 3×3 kernel elements, the maximum value will be 255×255×3×3=585,225 (in decimal), which may be represented using 20 bits. Then, the maximum value that may be obtained by summing this value with the maximum value obtainable by processing the next three by three kernel with the image data may be calculated as 585,225+585,225. Hence, the maximum value obtainable after processing the image data with the first two three by three kernels is 21 bits in binary. This process may be repeated for each subsequent three by three kernel. For example, the maximum value obtainable after processing the image data with the first three and four three by three kernels is 21 bits and 22 bits respectively.

Based on this calculation, initially, the upper 12 bits of the second output register 130*d* may be placed into the power saving state (corresponding to the upper 12 single-bit storage devices of the second output register 130*d*), leaving 20 bits of the second output register 130*d* in an active state (corresponding to the lower 20 single-bit storage devices of the second output storage register 130*d*). The second output register 130*d* may thus have capacity to store the maximum value obtainable by processing the first three by three kernel with the image data. Subsequently, for example between performing the first convolution (by processing the first three by three kernel with the image data) and the second convolution (by processing the next three by three kernel with the image data), the upper 11 bits of the second output register 130*d* may be placed into the power saving state, and the lower 21 bits of the second output register 130*d* may be placed into an active state. This process may continue as the ALU 123 performs an increasing number of convolutions, increasing the number of single-bit storage devices of the second output register 130*d* in the active state over time. This may further reduce the power consumption of the data processing system.

It is to be appreciated that the power consumption of the data processing system may be reduced in a number of different ways in addition to those described above, which are not intended to be limiting.

For example, the value of the weights represented by the weight data may be determined, for example by the control system 134 or externally to the neural network accelerator 108. The sum of these values may be calculated and multiplied by the maximum possible value of the image data (or the feature map derived from the image data), which is for example 255 (in decimal) for 8-bit data corresponding to one color channel. A subset of the second plurality of single-bit storage devices of the second output register 130*d* to be placed into the power saving state may be determined based on this value, for example so that there are at least enough single-bit storage devices of the second output register 130*d* in the active state to store data with this maximum calculated value.

In some cases, some of the pixel values or feature map values may be zero. For example, at least 50% of the pixel values or feature map values may be zero for inputs to at least some of the layers of a neural network. In such cases, it may be assumed that this is the case (without calculating the precise proportion of pixel values or feature map values that are zero for given input data), and the maximum output obtainable for storage by the second output register 130*d* may be calculated on this basis. A subset of single-bit storage devices of the second output register 130*d* may then be placed into the power saving state accordingly. Alternatively, in such cases, the input data (which for example represents pixel values or feature map values) may have been compressed due to the large number of zeroes. The input data may therefore include compression metadata from which it may be determined how many of the pixel values are zero. In this case, the actual maximum output obtainable or storage by the second output register 130*d* may be calculated and the subset of single-bit storage devices of the second output register 130d may then be placed into the power saving state appropriately.

In yet further examples, the input data may include metadata representative of the maximum value associated with the input data, such as the maximum pixel value for pixels within an image or within an image region, or from which the maximum value can be determined. Alternatively, metadata associated with the input data may be processed to calculate a sum of input values represented by the input data. Based on this, a subset of single-bit storage devices of at least one of the registers of the neural network accelerator 108 may be placed into the power saving state, where it is determined for example that the maximum value to be stored in the at least one register is less than the predetermined data size of the respective at least one register.

For example, if the metadata represents a histogram of a pixel intensity of pixels of a portion of the image, it may be determined from the histogram that 50% of the pixel intensity values are from 127. From this, it can be determined that the sum of the input values is at most 75% of the maximum value. This may be used to place a subset of single-bit storage devices of the second output register 130d into the power saving state, as fewer single-bit storage devices than the predetermined data size of the second output register 130d may be used to store the maximum output of a convolution of a set of kernels with the portion of the image, as the portion of the image has a data size which is at most 75% of the maximum data size.

The output of the addition unit 136 may subsequently be transferred to storage 138 of the neural network accelerator 108 before it may be transferred elsewhere, for example back to the computer device 104, where it may be returned to a user. The storage 138 may for example form part of the SRAM 128 or may be a separate storage, such as a buffer for storing the output temporarily.

Figure 6:
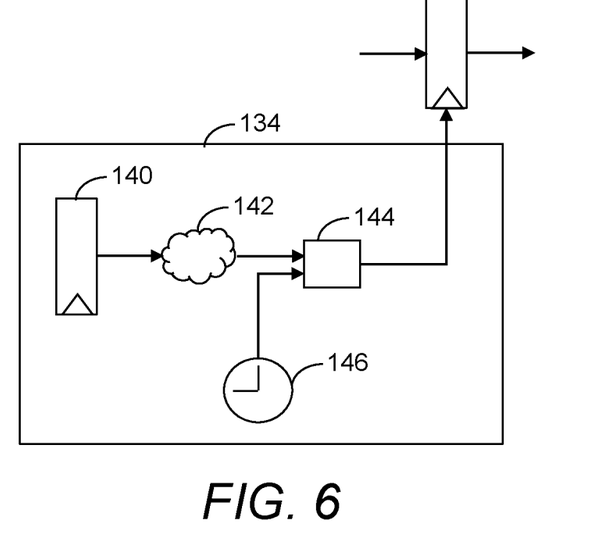
FIG. 6 shows schematically components of a control system according to examples.

The control system 134 of FIG. 5 will now be described in further detail with reference to FIG. 6. The control system 134 in this example includes a register 140 for storing control data for control of the data processing system. The control data may for example include the at least one parameter (which may be or include one or both of the first or second at least one parameter discussed above), which may be used to determine which of the single-bit storage devices of which of the plurality of registers 130a, 130b, 130c, 130d (collectively referred to as 130) of the first MAC unit 123 are to be placed into the power saving state. The at least one parameter may be stored in any suitable data structure. In other examples, the register 140 may instead store a data structure which directly indicates which of the single-bit storage devices of which of the plurality of registers 130 are to be placed into the power saving state.

The control system 134 further includes processing logic 142 which may be used to generate appropriate control signals to place the subset of the single-bit storage devices of at least some of the registers 130 into the power saving state. For example, the processing logic 142 may process the at least one parameter to determine which of the single-bit storage devices are to be placed into the power saving state and subsequently generate the control signals.

The control system 134 may then generate at least one control signal. In the example of FIG. 5, the output of the processing logic 142 is coupled to a clock gating cell 144, which may be referred to as an integrated clock gating cell. The clock gating cell 144 also receives a clock signal from a clock 146. The output of the clock gating cell 144 is provided to the first input register 130a in this example, although it is to be appreciated that each of the registers 130 will be coupled similarly to the control system 134 (for example each to a different respective AND gate, which is coupled to the same clock 146, which is for example a system clock). In examples, the clock gating cell may include a latch, which receives the output of the processing logic 142 and the clock signal as inputs, and an AND gate, which receives the output of the latch and the clock signal as inputs.

The control system 134 in this example is arranged to generate at least one control signal to clock gate the clock signal of the clock 146 to place a subset of the plurality of single-bit storage devices of the first input register 130a into the power saving state. A subset of single-bit storage devices of the other registers 130 may be placed into the power saving state similarly.

As explained previously, classification of image data using a neural network such as the neural network 118 of FIG. 3 typically involves a number of stages. An example of such processing is shown in the flow diagram of FIG. 7, to put the examples described herein into further context. The method of FIG. 7 may be implemented using the data processing system shown in FIG. 5.

Figure 7:
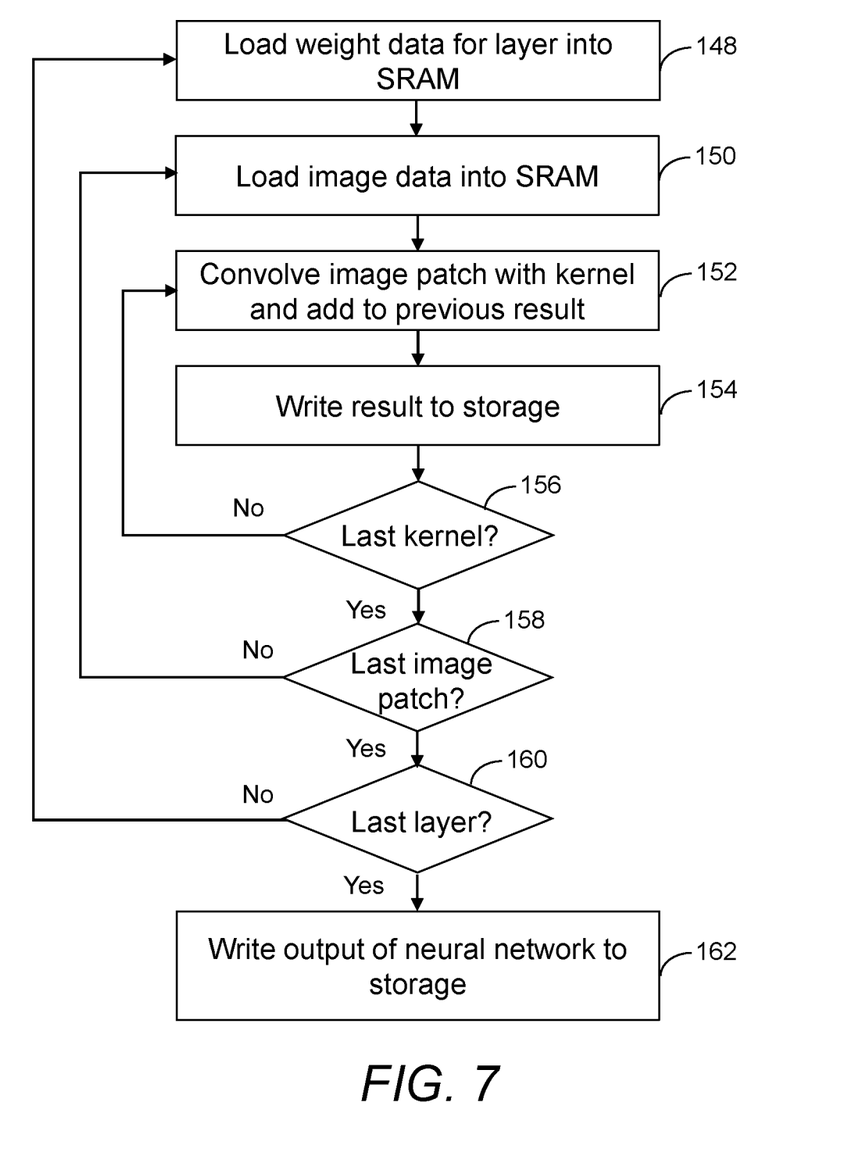
FIG. 7 is a flow diagram showing a method of processing image data using a neural network according to examples.

At item 148 of FIG. 7, the weight data for a layer of the neural network is loaded into the SRAM 128 of the neural network accelerator 108.

At item 150 of FIG. 7, the image data to be classified is loaded into the SRAM 128. The image data for example represents a patch of an image to be classified.

At item 152 of FIG. 7, the image patch is convolved with the kernel represented by the weight data and the result of this convolution is added to previous results, for example using a multiplication-addition operation, which may be implemented by a MAC unit. For example, this convolution may involve multiplying individual kernel elements (which may be considered to be weights) with pixel values and adding the output of this multiplication to other multiplications between the same kernel element and pixel values of different pixels or between different kernel elements and pixel values of pixels of the image patch.

At item 154 of FIG. 7, the output of the convolution is written to storage. The SRAM 128 of the neural network accelerator 108 may include the storage or the storage may be located in a different component or element than the neural network accelerator 108, such as DDR-SRAM of the computer device 104.

At item 156 of FIG. 7, it is determined whether the kernel convolved with the image patch is the last kernel associated with the layer of the neural network. If not, items 152 and 154 are repeated again for each kernel, until a convolution between the image patch and each kernel has been performed.

At item 158 of FIG. 7, it is determined whether the image patch is the last image patch to be processed. Typically, the image to be classified is divided into image patches and the convolutions are performed for each image patch. Then, subsequent image patches may be processed in the same way until the entire image has been convolved with the kernels associated with the layer of the neural network. If the image patch is not the last image patch to be processed, items 150, 152, 154 and 156 are repeated, for example by loading the subsequent image patch to be processed into the SRAM 128.

At item 160 of FIG. 7, it is determined whether the layer is the last layer of the neural network. If not, items 148 to 158 of FIG. 7 are repeated for the subsequent layer of the neural network. Typically, the output of a previous layer is used as an input to the subsequent layer. For example, the output of one layer may be considered to be a feature map, which may be used as the image data in item 150 of FIG. 7.

If the layer is the last layer, the output of the neural network is written to the storage at item 162, which is for example the storage 138 of the neural network accelerator 108.

The above examples are to be understood as illustrative examples. Further examples are envisaged. For example, although in examples above, the data processing system is used for the classification of image data by a neural network, this is not to be taken as limiting. Indeed, it is to be appreciated that the data processing system may be used for classification or inference of any type of data (such as language data representative of words or sentences, for natural language processing), using any type of machine learning system. Furthermore, the data processing system may be used for other processing which does not involve a machine learning system. For example, the data processing system may be used to process image data using image data methods that involve convolution of kernels with image patches for other purposes than as part of a machine learning system.

It is to be appreciated that although certain components are shown as performing various steps of the methods described herein, in other examples, other components (such as other electronic components or other software and/or hardware) may perform these steps. For example, in FIG. 4, the at least one parameter is received by the neural network accelerator 108 via the interface 124. In this example, the at least one parameter is therefore determined by another component than the neural network accelerator 108 (such as the CPU 106). However, in other examples, the at least one parameter may instead be determined by the neural network accelerator 108.

The order of processing steps in the examples described above are merely examples. In other examples, these processing steps may be performed in a different order. For example, an image or a feature map derived from image data may be divided into chunks, which may be referred to as tiles. Each tile may be processed separately through a layer of a neural network. Alternatively, an entire image or entire feature map may be processed using a subset of slices of a layer of a neural network (such as a subset of the total number of kernels associated with the layer) to generate partial results that may be added together to generate a final result. In examples involving the generation of partial results, the calculation of the maximum result may be calculated and used to place the relevant subset of single-bit storage devices into the power saving state.

In the examples above, the image data and the weight data are each 8-bit unsigned data. However, in other examples, data that may be processed using the methods and systems described herein may be of different formats. For example, such data may be signed or unsigned and may be integer or fixed point. Furthermore, such data may have a predetermined data size which differs from 8 bits.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A data processing system comprising:
   an arithmetic logic unit (ALU) configured to perform a data processing operation;
   a register arranged to receive an output of the data processing operation, the register comprising a plurality of single-bit storage devices arranged to store binary data of a predetermined data size; and
   a control system arranged to place a subset of the plurality of single-bit storage devices into a power saving state based on at least one parameter relating to the data processing operation, to limit an output data size of the output of the data processing operation to less than the predetermined data size.

2. The data processing system according to claim 1, wherein the at least one parameter comprises a parameter representative of a weight data size of a weight associated with a machine learning system, for input to the data processing operation.

3. The data processing system according to claim 1, wherein the at least one parameter comprises a first parameter representative of an input data size of an input to the data processing operation and a second parameter representative of an effect of the data processing operation on the input data size of the input.

4. The data processing system according to claim 3, wherein the first parameter is representative of a largest input data size of a plurality of inputs comprising the input.

5. The data processing system according to claim 1, wherein the output data size is a largest data size obtainable by application of the data processing operation to an input with a predetermined input data size.

6. The data processing system according to claim 1, wherein:
   the ALU is arranged to receive:
      image data representative of at least a portion of an image as a first input; and
      kernel data representative of a kernel as a second input; and
   the data processing operation comprises processing the image data with the kernel data to convolve the at least the portion of the image with the kernel.

7. The data processing system according to claim 1, comprising a clock coupled to the register, the clock configured to generate a clock signal,
   wherein the control system is arranged to generate at least one control signal to clock gate the clock signal to place the subset of the plurality of single-bit storage devices into the power saving state.

8. The data processing system according to claim 1, wherein:
   the ALU comprises a multiply-accumulate (MAC) unit configured to perform a multiplication operation and an addition operation; and
   one of:
      the data processing operation is the multiplication operation and the register is arranged to receive an output of the multiplication operation; or
      the data processing operation is the addition operation and the register is arranged to receive an output of the addition operation.

9. The data processing system according to claim 1, wherein:
   the ALU comprises a multiplier-accumulator (MAC) unit configured to perform a multiplication operation and an addition operation;

the data processing operation is the multiplication operation;

the register is a first output register arranged to receive a first output, the first output being output from the multiplication operation;

the plurality of single-bit storage devices of the first output register is a first plurality of single-bit storage devices;

the predetermined data size is a first predetermined data size;

the at least one parameter is a first at least one parameter relating to the multiplication operation;

the output data size is a first output data size; and the data processing system further comprises:
  a second output register arranged to receive a second output, the second output being output from the addition operation, the second output register comprising a second plurality of single-bit storage devices arranged to store binary data of a second predetermined data size,
  wherein the control system is arranged to place a subset of the second plurality of single-bit storage devices into a power saving state based on a second at least one parameter relating to the addition operation, to limit a second output data size of the second output to less than the second predetermined data size.

10. The data processing system according to claim 9, wherein the addition operation is configured to receive the first output as an input and the second at least one parameter comprises a parameter representative of the first output data size of the first output.

11. A data processing method comprising:
  determining at least one parameter relating to a data processing operation arranged to be implemented by an arithmetic logic unit (ALU);
  based on the at least one parameter, placing a subset of a plurality of single-bit storage devices of a register into a power saving state, to limit an output data size of an output of the data processing operation to less than a predetermined data size, wherein the register is arranged to receive the output of the data processing operation and the plurality of single-bit storage devices are arranged to store binary data of the predetermined data size.

12. The data processing method according to claim 11, wherein determining the at least one parameter comprises determining which of a plurality of inputs for input to the data processing operation has a largest input data size.

13. The data processing method according to claim 12, comprising determining the at least one parameter before the plurality of inputs are input to the data processing operation.

14. The data processing method according to claim 11, wherein determining the at least one parameter comprises determining an effect of the data processing operation on an input data size of an input to the data processing operation.

15. The data processing method according to claim 11, wherein determining the at least one parameter comprises determining the output data size of the output of the data processing operation for an input with a predetermined input data size.

16. The data processing method according to claim 11, wherein the at least one parameter comprises a parameter representative of a weight data size of a weight associated with a machine learning system, for input to the data processing operation.

17. The data processing method according to claim 11, wherein the data processing operation is arranged to receive image data representative of at least a portion of an image as an input and the method comprises determining the at least one parameter based on metadata associated with the image data, the at least one parameter comprising a parameter representative of an image data size of the image data.

18. The data processing method according to claim 17, wherein the metadata is representative of a dynamic range of the at least the portion of the image.

19. A data processing method comprising:
  determining at least one parameter relating to a data processing operation arranged to be implemented by an arithmetic logic unit (ALU);
  based on the at least one parameter, placing a subset of a plurality of single-bit storage devices of a register into a power saving state, to limit an input data size of an input to the data processing operation to less than a predetermined data size, wherein the register is arranged to store the input to the data processing operation, and the plurality of single-bit storage devices are arranged to store binary data of the predetermined data size.

20. The data processing method according to claim 19, comprising limiting the input data size to a largest input data size of a plurality of inputs to the data processing operation, the plurality of inputs comprising the input.

\* \* \* \* \*